April 2, 1946. R. F. STALLMAN 2,397,703
SELF-LOCKING SHAFT LOCK
Filed May 14, 1943 2 Sheets-Sheet 1
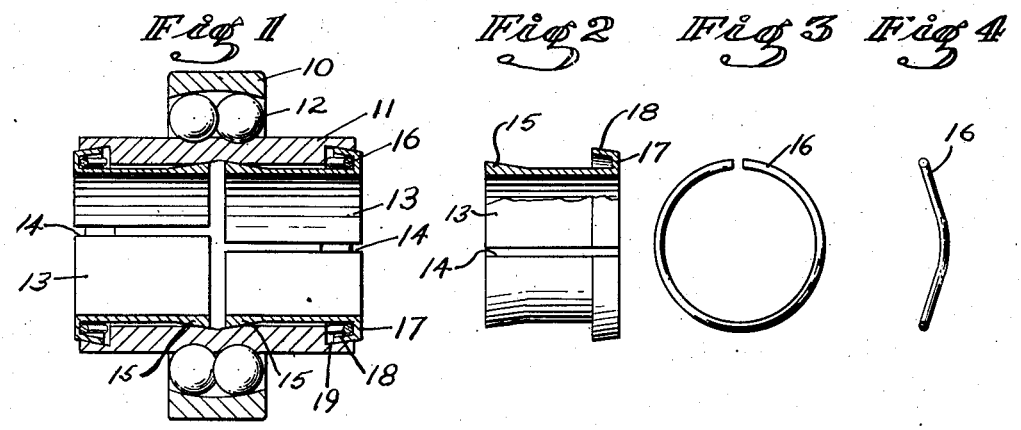
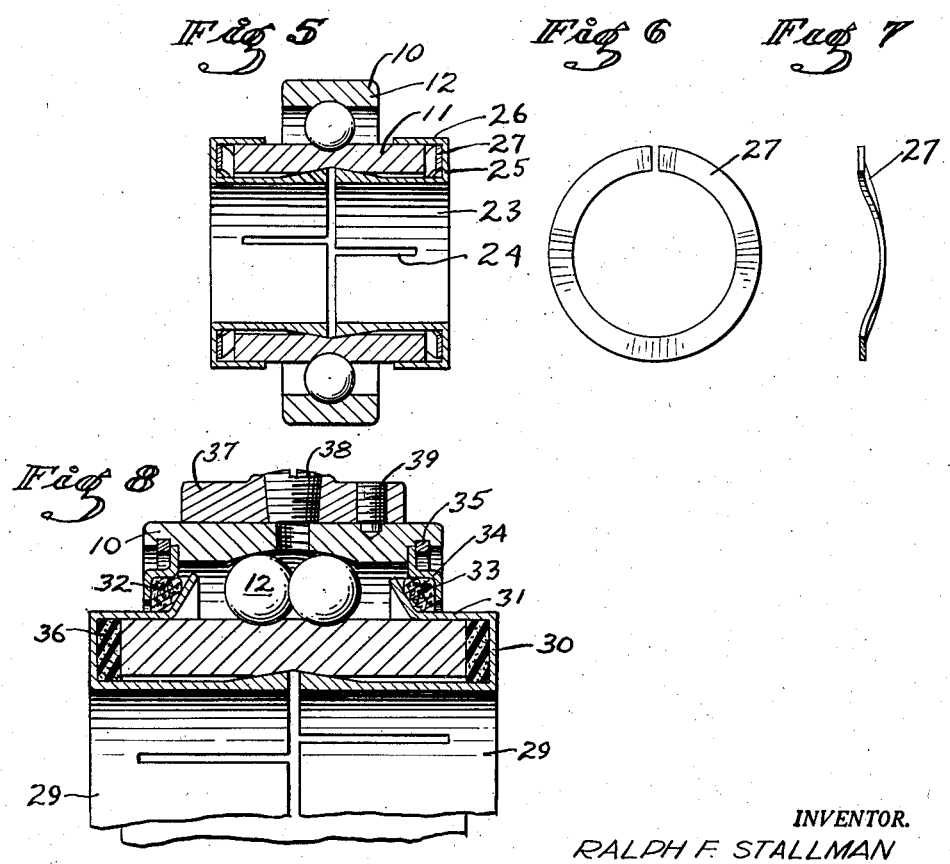
INVENTOR.
RALPH F. STALLMAN
BY
Castberg & Roemer
ATTORNEYS.

April 2, 1946.  R. F. STALLMAN  2,397,703
SELF-LOCKING SHAFT LOCK
Filed May 14, 1943    2 Sheets-Sheet 2

INVENTOR.
RALPH F. STALLMAN
BY
Castberg & Roemer
ATTORNEYS.

Patented Apr. 2, 1946

2,397,703

UNITED STATES PATENT OFFICE 2,397,703

SELF-LOCKING SHAFT LOCK

Ralph F. Stallman, Oakland, Calif.

Application May 14, 1943, Serial No. 486,979

2 Claims. (Cl. 308—236)

This invention relates to shaft locks for bearings, and particularly to a mechanism employed for locking the inner race of a bearing of the ball, roller, or similar type, to the shaft which is supported for rotation by the bearing.

Line shafts and other shafts employed for power transmission are usually supported by a plurality of bearings housed or supported in bearing hangers or pillow blocks. For perfect operation, the inner race of the bearing must form a tight fit with the shaft to preclude any possibility of relative movement such as rocking, creeping, or shifting of the race on the shaft. A tight press fit is ideal for this purpose, but impractical because of the length of the shaft. To enable bearings to be assembled on long shafts, it is customary to provide clearance exceeding .001 inch between the shaft size and the size of the inner race which must slip over the shaft. Due to variations in shaft diameters resulting from various causes, this clearance is often much greater than necessary, and even with a minimum clearance, the fit of the race on the shaft is such that relative movement of the race and shaft is possible. The use of set screws for fixing the race in position on the shaft results in an eccentric and cocked position of the race which generally increases rather than decreases the undesirable relative movement. This is also true of other securing devices which tend to hold more firmly at one end of the race than at the other.

It is the object of the present invention, therefore, to provide a bearing shaft lock which seizes the shaft centrally of the bearing race and produces an effect which is the equivalent or superior to that produced by a very tight press fit.

A further object of the invention is to provide a shaft lock for bearings which is asembled as a part of the bearing and permits the bearing to slide freely over the shaft but automaticaly seizes the shaft when the bearing is permitted to rest in its intended position thereon.

A still further object is the provision of a bearing shaft lock formed as a part of a cartridge bearing assembly and coacting with other parts of the assembly to provide an improved lubricant and dust seal therefore.

Still further objects of the invention are made apparent by the following specification wherein reference is made to the acompanying drawings disclosing typical structures in which the invention may be embodied:

In the drawings:

Fig. 1 is a vertical, longitudinal section through a bearing embodying the present invention;

Fig. 2 is a side elevation partially in section of a sleeve member employed in the construction of the bearing shown in Fig. 1;

Fig. 3 is a front elevation of a spring used in conjunction with the sleeve shown in Fig. 2;

Fig. 4 is a central vertical section taken through the spring shown in Fig. 3;

Fig. 5 is a vertical longitudinal section illustrating a modified form of the shaft lock shown in Fig. 1;

Fig. 6 is a front elevation of a spring used in Fig. 5;

Fig. 7 is a central vertical section of the spring shown in Fig. 6;

Fig. 8 is a vertical longitudinal fragmentary section of a bearing embodying the shaft lock of the present invention combined with an oil seal of the bearing in a manner to provide a complete bearing assembly or so-called cartridge type of bearing;

Figure 9:
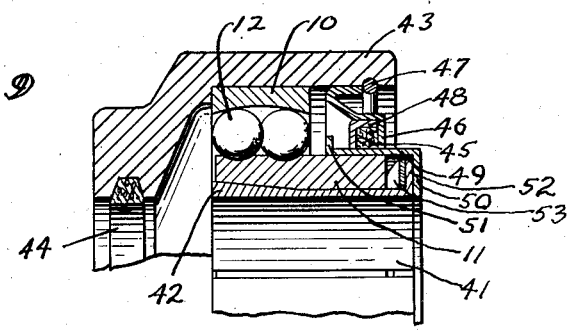
Fig. 9 is a further modification of the invention showing the same with a single shaft gripping sleeve rather than a pair of such sleeves as illustrated in the other views.

In Fig. 1 a bearing is illustrated as comprising the usual outer race 10, inner race 11, and intermediate antifriction members or balls 12. The antifriction members here shown as two rows of balls may be a single row as illustrated in Fig. 5, or may be rollers of cylindrical or other form, the particular type of antifriction member employed being immaterial to the construction of the present invention. According to the invention, the inner race 11 of the bearing, which is conventionally made to slide over the shaft upon which it is to be used with as tight a fit as practicable, is considerably larger than the shaft size so as to accommodate a pair of sleeves shown at 13. These sleeves are split from end to end providing gaps 14 which, due to the inherent resiliency of the metal of which the sleeves are formed, permits them to be compressed to a diameter which will facilitate their insertion into the bearing race where they are allowed to expand to a size at which they will slide easily over the shaft. The inner ends of the sleeves 13 are enlarged as shown at 15 (see also Fig. 2) to form conical tapers which, when the sleeves are assembled in the race, register with, and are received in, complementary tapers formed by enlargement of the inner cylindrical surface of the race adjacent its center and in alignment with the center of the loaded area of the balls 12.

The structure thus far described is such that with the two sleeves 13 urged inwardly, their tendency to expand enlarges their inner diameters, thus increasing the effective bore of the inner race so that the bearing may easily be assembled on a shaft which it is designed to fit. If the sleeves are drawn outwardly or away from each other, their conical tapers 15 engage with the complementary tapers in the bore effecting a contraction or reduction in the size of the sleeves, and assuming the bearings have been assembled on the shaft, causing the sleeves to grip the shaft and also due to the engagement in the conical surfaces to grip the inner race 11, causing a tight fit between the shaft and the race. To maintain this tight fit under operating conditions during operation of the bearing, the sleeves 13 are urged outwardly by a pair of springs 16 which, as illustrated in Figs. 3 and 4, are annular springs of the marcel or wavy type.

The springs 16, as shown in Fig. 1, are received between outwardly projecting flanges 17 which are formed at the outer ends of the sleeves and the ends of the race 11. The race 11 is preferably recessed adjacent its outer ends and the flanges 17 may be continued or extended rearwardly to form walls 18, thus providing a cup-like annular recess within which the springs are received with the flanged walls 18 slightly tapered, as shown, and registering with a similar taper 19 formed in the ends of the bearing race. This spring is effectively enclosed against the entry of dust and other foreign matter when the bearing is assembled on the shaft. The outer ends of the sleeves project a short distance beyond the ends of the bearing race so that the springs 16, which are normally lightly loaded, can be compressed by engaging the ends of the sleeve and moving them toward each other. This movement also effects enlargement of the sleeve as heretofore described so that the bearing may easily be placed upon the shaft. When released, the loaded springs 16 force the sleeves outwardly to effect gripping of the shaft and bearing race which will prevent any relative movement of these members. Any tendency of the race to move relative to the shaft which would ordinarily cause looseness of the race on the shaft will permit the springs 16 to urge the sleeves outwardly a greater distance, thus taking up any play and tightening the grip.

Through this structure the bearing race is seized to the shaft concentrically and centrally of the loaded area so that no tendency to rock or shift on the shaft has been created. While the fit of the race on the shaft thus accomplished is unusually tight and secure, the race may be very easily removed by urging the sleeves 13 inwardly or toward each other so as to effect an enlargement of their inner diameter and free them from the shaft. This may be accomplished by any suitable means of exerting inward pressure against the projecting ends of the sleeves. A light hammer blow on either one of the sleeves will accomplish the desired result. An extremely simple method of removing the bearing is to place around the shaft an iron ring which fits loosely on the shaft so that it may be brought abruptly against one of the sleeves. This blow will drive the sleeve inwardly, loosening it from its gripping position, and the same blow will strike the end of the bearing race 11, thus moving it relative to the opposite sleeve so that both sleeves are opened with a single blow which tends to carry the bearing off with the shaft in either direction, depending upon the end at which it has been struck.

A modified form of the invention is shown in Figs. 5, 6 and 7. In Fig. 5 the outer race of the bearing is also designated at 10, the inner race at 11, and the antifriction balls at 12. The gripping sleeves in Fig. 5 are shown at 23, and are of slightly different form than those shown at 13 in Figs. 1 and 2 in that they are slotted at 24, not throughout their length, but rather at their inner tapered ends only. It is possible to assemble the sleeves in the bearing race without contacting their outer ends by reason of the fact that the outer ends are cupped in a manner to receive the entire outer end of the race 11. To accomplish this, the sleeves are flanged outwardly as indicated at 25, and also flanged back in the direction of their length as shown at 26 to form an annular cup which slides over the outer periphery of the bearing race 11 and which contains a flat marcel spring 27 shown in Figs. 6 and 7 which serves the same purpose as the spring 16 of Fig. 1. The assembly of this form of bearing on the shaft and its removal from the shaft are the same as those described in connection with the structure of Fig. 1.

The structure of Fig. 8 illustrates a modified form of the invention wherein the shaft gripping sleeves are shaped to combine with sealing rings of the bearing, to provide a cartridge-like assembly which may be merchandised as a unit with all parts assembled to prevent accidental displacement or removal. In this illustration the outer race, inner race, and antifriction balls are again shown at 10, 11 and 12, respectively, and the shaft gripping sleeves are illustrated at 29. These sleeves 29 are identical with the sleeves 23 shown in Fig. 5 with the exception that in addition to radial flanges 30 and lateral flanges 31, they are flared outwardly to provide flanges or inclined skirts 32. These skirts 32 engage behind sealing rings 33 of felt or other similar material which are retained in the bearing assembly by annular covers 34 positioned in the ends of the outer race 10 and held in place by resilient snap rings 35 which fit into grooves in the race which are provided for this purpose. The arrangement of the sealing ring 33 is more or less conventional, but it serves a further purpose and is also employed more effectively as a sealing device in the structure of the present invention because of the fact that the outward movement of the sleeves 30 tends slightly to compress the sealing rings 33 in a longitudinal direction, and the sealing rings with their retaining members serve to hold the sleeves 30 against removal from the assembly. In this structure the means for urging the sleeves 29 outwardly is shown as rings 36 of sponge rubber, or other similar elastic material. The use of such material, however, is optional as springs of the kind illustrated in Figs. 3 and 6 may be used for this purpose. The cartridge is capable of quick assembly into any conventional housing or pillow block designed to receive the same and indicated at 37 as having a removable plug 38 through which the bearing may be lubricated and as having a dowel screw 39 which engages with a dowel hole in the outer race to retain the bearing against endwise floating movement in the pillow block if desirable. The dowel screw is removed where endwise floating is required to accommodate shaft expansion.

Figure 10:
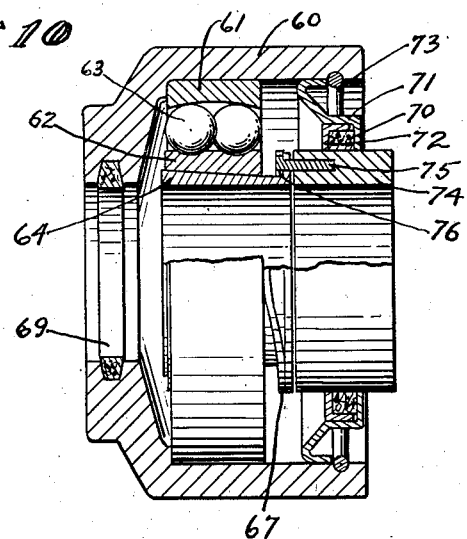
Fig. 10 illustrates the invention applied to a bearing having a relatively short inner race.
Figure 11:
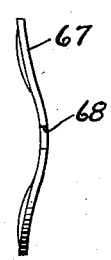
Fig. 11 illustrates a spring used in the bearing shown in Fig. 10.
Figure 12:
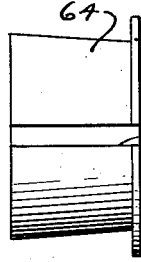
Fig. 12 is an illustration of a sleeve used in a bearing shown in Fig. 10.
Figure 13:
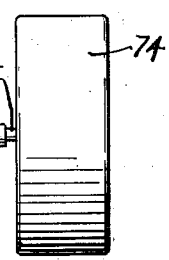
Fig. 13 is a view of a collar used in conjunction with the bearing as illustrated in Fig. 10.

Fig. 9 of the drawings illustrates a modification of the invention wherein a single expandable sleeve 41 serves to secure the inner race 11 to the shaft, the outer race being shown at 10, and the antifriction members at 12. In this construction the inner race 11 has its inner bore tapered at one end only to register with the tapered end 42 of the sleeve 41. This construction is considerably less expensive than the two sleeve structures heretofore described and is especially suited to small and inexpensive bearing assemblies. The structure is illustrated as employed with a conventional pillow block 43 in which the bearing is assembled to be merchandised as a complete unit. One end of this pillow block is provided with a felt grease retaining ring 44 which rides directly on the shaft on which the bearing is mounted. The opposite end is larger to receive the bearing and has a grease ring 45 which is held in place by a conventional cover 46 and snap ring 47. This grease ring 45 also has a metal and backing ring 48 and a special flanged sleeve 49 cooperates with the backing ring 48 and the shaft gripping sleeve 41. This flanged sleeve 49 also has an inward radial flange 50 at its outer end, and a radial flange 51 at the inner end. The flange 50 overlies a flange 52 formed at the outer end of the sleeve 41 and the spring 53 acts between the end of the race 11 and the flange 52 in the same manner as the springs 27 shown in Fig. 5. The outward radial flange 51 on the sleeve 49 will engage with the member 48 to prevent accidental removal of the shaft gripping sleeve from its proper position within the race. In the bearings so far illustrated and described, the inner race of the bearing is considerably longer than necessary, and longer than the outer race in order to accommodate the sleeves which serve to secure it to the shaft. Some bearings, however, are preferably made with a short inner race which presents certain advantages particularly in the manufacture of the bearing. The present invention is also adaptable to a bearing having a short race through the means illustrated in Figs. 10 to 13 inclusive. This figure shows the bearing illustrated as enclosed in a pillow block 60 and as having an outer race 61 and an inner race 62 between which the balls 63 are positioned. The inner race 62 is substantially the same race as the outer race 61, and a locking sleeve 64, also shown in Fig. 12, is provided with an exterior taper throughout its length which registers with a complementary taper extending throughout the entire length of the inner race 62. This sleeve 64 is flanged at its smaller end as shown at 65, and is also provided with a slot 66 to permit it to be contacted. A spring 67 (see also Fig. 11) is interposed between the flange 65 of the sleeve and the end of the inner race. This spring is provided with a slot 68 somewhat wider than the space ordinarily existing between the ends of a spring washer. The pillow block has the usual grease retaining ring 69 in one end and a similar ring 70 in its opposite end. The ring 70 is held in place by the usual cover 71, backing ring 72, and retainer ring 73. Instead of contacting the shaft, the grease ring 70 contacts a collar 72 which has an inside diameter fitting the shaft for permitting it to slide freely over the shaft for purposes of assembly. The collar 74 as shown in Figs. 10 and 13, is provided with a pin 75 projecting laterally from its inner end and having a head 76. This pin 75 serves as a driving connection between the locking sleeve 64 and the collar so that the collar will be caused to rotate with the shaft. This will avoid the collar being held by the friction of the grease retaining ring 70 which might possibly cause it to turn on the shaft and eventually become very loose. The pin 75 extends through the slot 66 in the locking sleeve 64 and its head 76 projects into the slot 68 of the spring washer 67, thus also causing the washer to rotate with the sleeve and the inner race of the bearing to avoid any possibility of friction and wear because of relative rotation of the washer with its adjacent parts. The shank of the pin 75 is somewhat smaller than the slot 66 in the sleeve 64 so that it does not interfere with contacts of the sleeve necessary to release the bearing from the shaft. The endwise movement of the sleeve necessary to release the bearing from the shaft may be accomplished in this structure by striking the end of the collar 74 which in turn strikes the end of the sleeve 64 to move it, thus imparting to the sleeve the endwise movement relative to the inner race of the bearing which releases its grip upon the shaft.

Having thus described my invention, what I claim and desire to secure by Letters Patent is:

1. In a shaft bearing, a tapered sleeve carried within the inner race of the bearing, spring means for inducing endwise movement of the sleeve relative to the bearing to lock the bearing to the shaft, a collar adjacent the bearing slidable on the shaft to engage the sleeve for releasing it from its locking position, and means connecting the collar and sleeve to compel the collar to rotate with the shaft.

2. In a shaft bearing, a tapered sleeve carried within the inner race of the bearing, spring means for inducing endwise movement of the sleeve relative to the bearing to lock the bearing to the shaft, a collar adjacent the bearing slidable on the shaft to engage the sleeve for releasing it from its locking position, means connecting the collar and sleeve to compel the collar to rotate with the shaft, a pillow block or the like enclosing the bearing, and an oil sealing member interposed between the interior of the pillow block and the exterior of said collar.

RALPH F. STALLMAN.